United States Patent [19]

Knobloch

[11] 3,956,373
[45] May 11, 1976

[54] PROCESS FOR SULFURIC ACID PURIFICATION

[75] Inventor: James O. Knobloch, Naperville, Ill.

[73] Assignee: Standard Oil Company, Chicago, Ill.

[22] Filed: Aug. 20, 1973

[21] Appl. No.: 389,960

[52] U.S. Cl. ............................ 260/515 A; 423/528; 423/531
[51] Int. Cl.$^2$ .......................................... C07C 51/44
[58] Field of Search .................. 260/515 A; 423/528, 423/531

[56] References Cited

UNITED STATES PATENTS

| | | | |
|---|---|---|---|
| 2,044,419 | 6/1936 | Clarke | 423/528 |
| 2,643,938 | 6/1953 | Robinson | 423/528 |
| 3,142,701 | 7/1964 | Wilkinson | 260/515 |

FOREIGN PATENTS OR APPLICATIONS

| | | | |
|---|---|---|---|
| 1,128,435 | 9/1958 | United Kingdom | 423/531 |

OTHER PUBLICATIONS

Latimer et al., Ref. Book of Inorg. Chem., (1940), pp. 155–157.

Mellor's Modern Inorganic Chem., (1939), pp. 518–519.

*Primary Examiner*—James A. Patten
*Attorney, Agent, or Firm*—William H. Magidson; Arthur G. Gilkes; William T. McClain

[57] ABSTRACT

Process of reducing the bromine content of spent sulfuric acid bromination liquor containing organic impurities by blowing an oxygen containing gas through said sulfuric acid liquor at an elevated temperature at least until substantially all of the organic material in said liquor is oxidized.

9 Claims, No Drawings

PROCESS FOR SULFURIC ACID PURIFICATION

This invention relates to a method of reducing the bromine content of spent sulfuric acid bromination liquors.

Oleum (fuming sulfuric acid) has been used as a reactive solvent for the bromination of various aromatic compounds. For example, U.S. Pat. No. 3,142,701, which is incorporated by reference, discloses a method of producing 2,5-dibromoterephthalic acid by reacting substantially equal molar quantities of bromine and terephthalic acid in an oleum solution. For each mole of bromine consumed in this reaction, two moles of sulfur trioxide are converted to one mole of sulfur dioxide and one mole of sulfuric acid. Since the speed of the bromination reaction is very dependent on the concentration of sulfur trioxide, it is usually desirable to use high strength (40% by weight sulfur trioxide) oleum for such reaction. Accordingly, the economics of this type of bromination reaction is dependent upon reuse and/or salvage of spent sulfuric acid liquor. Inasmuch as the spent sulfuric acid liquor contains a relatively high concentration of bromine (800 to 5,000 p.p.m.) in ionic, elemental and covalent forms and oleum suppliers are unwilling to provide full sulfur credit for the spent sulfuric acid unless the bromine content is substantially reduced (preferably below 100 p.p.m.) it is necessary to provide a method of reducing the bromine content of spent sulfuric acid bromination liquors.

The general object of this invention is to provide a method of reducing the bromine content of spent sulfuric acid and bromination liquors.

A principal object of this invention is to provide a method of reducing the bromine content of spent sulfuric acid liquors produced in the bromination of aromatic polycarboxylic acids.

Another object of this invention is to provide a method of reducing the bromine content of spent sulfuric acid liquors produced in the bromination of terephthalic acid to 2,5-dibromoterephthalic acid.

Other objects appear hereinafter.

The objects of this invention can be attained by blowing or sparging an oxygen containing gas through the spent sulfuric acid bromination liquor at elevated temperatures until substantially all of the organic material in the liquor is oxidized. Either during and/or after sparging, bromine is stripped off in the gas stream. After substantially all of the organic material is oxidized, sulfuric acid containing less than 200 p.p.m. bromine, preferably less than 100 p.p.m. bromine, can be isolated by heating the sulfuric acid liquor at an elevated temperature to drive off the lower boiling bromine until the liquor in the pot has the requisite purity. Alternatively, after substantially all of the organic material is oxidized, the sulfuric acid can be fractionally distilled. If oxygen sparging is not employed, sulfuric acid of the desired purity cannot be obtained by these simple distillation techniques.

Briefly, this invention comprises a fractional distillation of a spent sulfuric acid bromination liquor wherein an oxygen containing gas is blown or sparged through said sulfuric acid liquor at an elevated temperature at least until substantially all of the organic material in said liquor is oxidized.

While substantially any spent sulfuric acid bromination liquor containing organic material can be used, this process is particularly useful for the purification of spent sulfuric acid liquors produced in the bromination of aromatic polycarboxylic acids, preferably terephthalic acid to 2,5-dibromoterephthalic acid. Accordingly, the present invention is described with reference to the purification of spent sulfuric acid bromination liquors produced when the process is used to produce 2,5-dibromoterphthalic acid (as in U.S. Pat. No. 3,142,701) or to produce tetrabromoterephthalic acid (when 2 moles of bromine per mole of terephthalic acid are used).

In somewhat greater detail, 2,5-dibromoterephthalic acid is produced by reacting substantially equal molar quantities of bromine and terephthalic acid in oleum (containing at least 25% by weight sulfur trioxide, preferably at least 40% by weight sulfur trioxide,) using an iodine catalyst. The insoluble 2,5-dibromoterephthalic acid is partitioned (filtration or centrifugation) from the oleum which contains various aromatic organic acids, such as tetrabromoterephthalic acid, tribromoterephthalic acid, bromoterephthalic acid, terephthalic acid, etc., and sulfur dioxide. At this point, the sulfur dioxide (b.p. −10°C.) and/or any free sulfur trioxide (b.p. 46°C.) can be fractionally distilled and recovered prior to blowing or sparging with an oxygen containing gas (oxygen or air). Alternatively blowing or sparging with an oxygen containing gas can be started at the same time as the fractional distillation of sulfur dioxide and/or any free sulfur trioxide commences.

The partially fractionated or unfractionated spent sulfuric acid bromination liquor containing the aforesaid organic acids is blown or sparged with an oxygen containing gas (oxygen or air) at an elevated temperature until substantially all of the organic material in the bromination liquor is oxidized. The sulfuric acid liquor is generally maintained at about 200°C. to 400°C., preferably 300°C. to 350°C. during the oxidation of the organic material. The oxidation temperature is primarily dependent on the type of equipment used and the head temperature of the reactor. For example, if the reactor is not equipped with a condenser or distillation column, the sulfuric acid liquor must be maintained at a sufficiently low temperature that the reactor head temperature is below the boiling point of sulfuric acid (about 316°C. at atmospheric pressure) to prevent loss of sulfuric acid. If the reactor is connected to a condenser or fractional distillation column, loss of sulfuric acid to the atmosphere can be avoided by conventional means and higher oxidation temperatures can be used. It is important to note that oxidation takes place in the liquid phase.

After substantially all of the organic material is oxidized, sulfuric acid containing less than 200 p.p.m. bromine, preferably less than 100 p.p.m. bromine can be isolated by either fractionally distilling sulfuric acid from the reactor or by heating the sulfuric acid liquor at an elevated temperature to drive off the lower boiling bromine until the sulfuric acid in the reactor has the requisite purity. The temperature for separating the sulfuric acid from bromine is dependent upon the type of equipment, the head temperature of the reactor and the method of recovery. For example, if the reactor is not equipped with a condenser or distillation column, the sulfuric acid is recovered as a residue after boiling off the bromine and the sulfur trioxide, provided the liquor in the pot has been maintained at a sufficiently low temperature that the reactor head temperature does not exceed the boiling point of sulfuric acid. If the reactor is connected to a fractional distillation column, the sulfuric acid can be recovered as a distillate cut and higher temperatures can be employed.

During the oxidation reaction, the oxygen containing gas is introduced into the bottom of the reactor at a rate sufficient to provide turbulence. Typically 50 to 1,000 cm$^3$ of gas (S.T.P.) per 100 grams of spent sulfuric acid bromination liquor is bubbled through the sulfuric acid liquor per minute.

The following examples are merely illustrative.

EXAMPLE I

Seventy-three and one-half grams of sulfuric acid (97.3% $H_2SO_4$ containing 1100 p.p.m. bromine) recovered from the bromination of terephthalic acid, and stripped of sulfur dioxide and sulfur trioxide, was placed in a 100 ml round bottom flask equipped with a thermowell, a fritted glass sparger for gas introduction in the liquid phase and a reflux condenser with an alembic on the lower end leading to a draw off line having a stopcock.

Heat and oxygen were supplied according to Table I below:

TABLE I

| Time in minutes | Oxygen Flow in cc./min. | Reactor Pot Temperature in °C. | Comments |
|---|---|---|---|
| 0 | 250 | 23.6 | |
| 24 | 250 | 109 | |
| 73 | 250 | 170 | |
| 104 | 250 | 172 | |
| 121 | 250 | 193 | |
| 131 | 250 | 200 | |
| 151 | 250 | 219 | |
| 156 | 200 | 222 | |
| 181 | 200 | 277 | |
| 191 | 175 | 284 | |
| 201 | 150 | 304 | |
| 241 | 150 | 312 | |
| 259 | 150 | 313 ] | 2.6 grams |
| 304 | 150 | 314 ] | condensate drawn |
| 343 | 150 | 311 ] | from reflux |
| 371 | 150 | 311 ] | |
| 392 | 150 | 320.5 | |
| 419 | 150 | 320.5 | 1.1 gram from alembic at end of treatment |

The condensate drawn from reflux contained 4,780 p.p.m. bromine. The alembic cut contained 1,410 p.p.m. bromine and the sulfuric acid in the flask contained 203 p.p.m. bromine. The amount of bromine in the flask can be reduced further to less than 100 p.p.m. by maintaining the reactor at 320°C. for a longer period.

EXAMPLE II

This example illustrates two methods of isolating sulfuric acid having less than 200 p.p.m. bromine from the "oxidized" sulfuric acid composition produced in Example I. An arbitrary 50.9% of the "oxidized" sulfuric acid containing 203 p.p.m. bromine from Example I was distilled overhead at 330° to 332°C. pot temperature and atmospheric pressure and collected in four almost water white cuts. The material remaining in the bottom of the reactor was dark red in color. The purity of the material remaining in the reactor and in the four cuts is set forth below in Table II.

TABLE II

| Cut | Weight in grams | P.P.M. Bromine |
|---|---|---|
| 1 | 2.8 | 87 |
| 2 | 4.4 | 43 |
| 3 | 5.1 | 48 |
| 4 | 13.0 | 36 |
| Reactor | 24.4 | 176 |

The above data indicates that after the organic material in the spent sulfuric acid bromination liquor is oxidized, sulfuric acid containing low levels of bromine can be isolated by distilling off sulfuric acid or by heating to drive off the bromine from the oxidized liquor. In this example, 47% of the total bromine charged to the distillation apparatus was not accounted for in the distillate (25.3 g of sulfuric acid containing 45.3 ppm Br) or in the 24.4 g of undistilled sulfuric acid (176 ppm Br).

I claim:

1. The process of reducing the bromine content of spent sulfuric acid bromination liquor containing organic impurities which comprises blowing an oxygen containing gas through said sulfuric acid liquor at an elevated temperature at least until substantially all of the organic material in said liquor is oxidized.

2. The process of claim 1, wherein after substantially all of the organic material is oxidized, sulfuric acid having less than 200 p.p.m. bromine is isolated by distillation of sulfuric acid from the oxidized liquor.

3. The process of claim 1, wherein after substantially all of the organic material is oxidized, sulfuric acid having less than 200 p.p.m. bromine is isolated by distilling bromine from the oxidized liquor until the oxidized liquor has less than 200 p.p.m. bromine.

4. The process of claim 1, wherein said liquor is oxidized at 200° to 400°C.

5. In the process of producing 2,5-dibromoterephthalic acid by reacting substantially equal molar quantities of terephthalic acid and bromine in an oleum medium, the improvement which comprises reducing the bromine content of the spent sulfuric acid bromination liquor containing aromatic carboxylic acids by blowing an oxygen containing gas through said sulfuric acid liquor at an elevated temperature at least until substantially all of the aromatic carboxylic acids in said liquor is oxidized.

6. The process of claim 1, wherein said organic impurities comprise aromatic carboxylic acids.

7. The process of claim 5, wherein after substantially all of the aromatic carboxylic acids are oxidized, sulfuric acid having less than 200 p.p.m bromine is isolated by distillation of sulfuric acid from the oxidized liquor.

8. The process of claim 5, wherein after substantially all of the aromatic carboxylic acids are oxidized, sulfuric acid having less than 200 p.p.m. bromine is isolated by distilling bromine from the oxidized liquor until the oxidized liquor has less than 200 p.p.m. bromine.

9. The process of claim 5, wherein said liquor is oxidized at 200° to 400°C.

* * * * *